Sept. 22, 1942.  G. W. ASHLOCK, JR  2,296,490
FRUIT ORIENTING DEVICE
Filed May 28, 1941  2 Sheets-Sheet 1
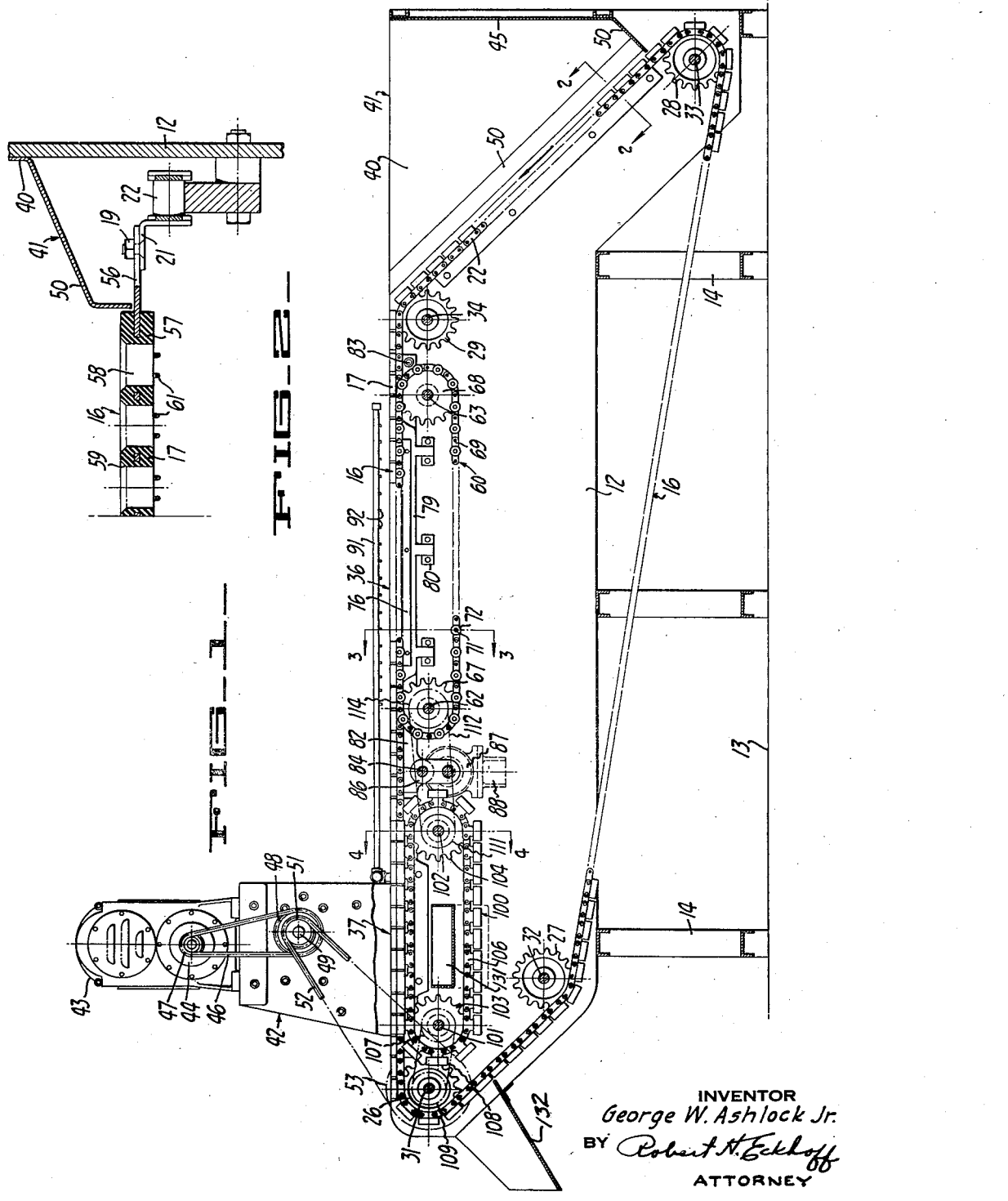
INVENTOR
George W. Ashlock Jr.
BY Robert N. Eckhoff
ATTORNEY Sept. 22, 1942.   G. W. ASHLOCK, JR   2,296,490
FRUIT ORIENTING DEVICE
Filed May 28, 1941   2 Sheets-Sheet 2
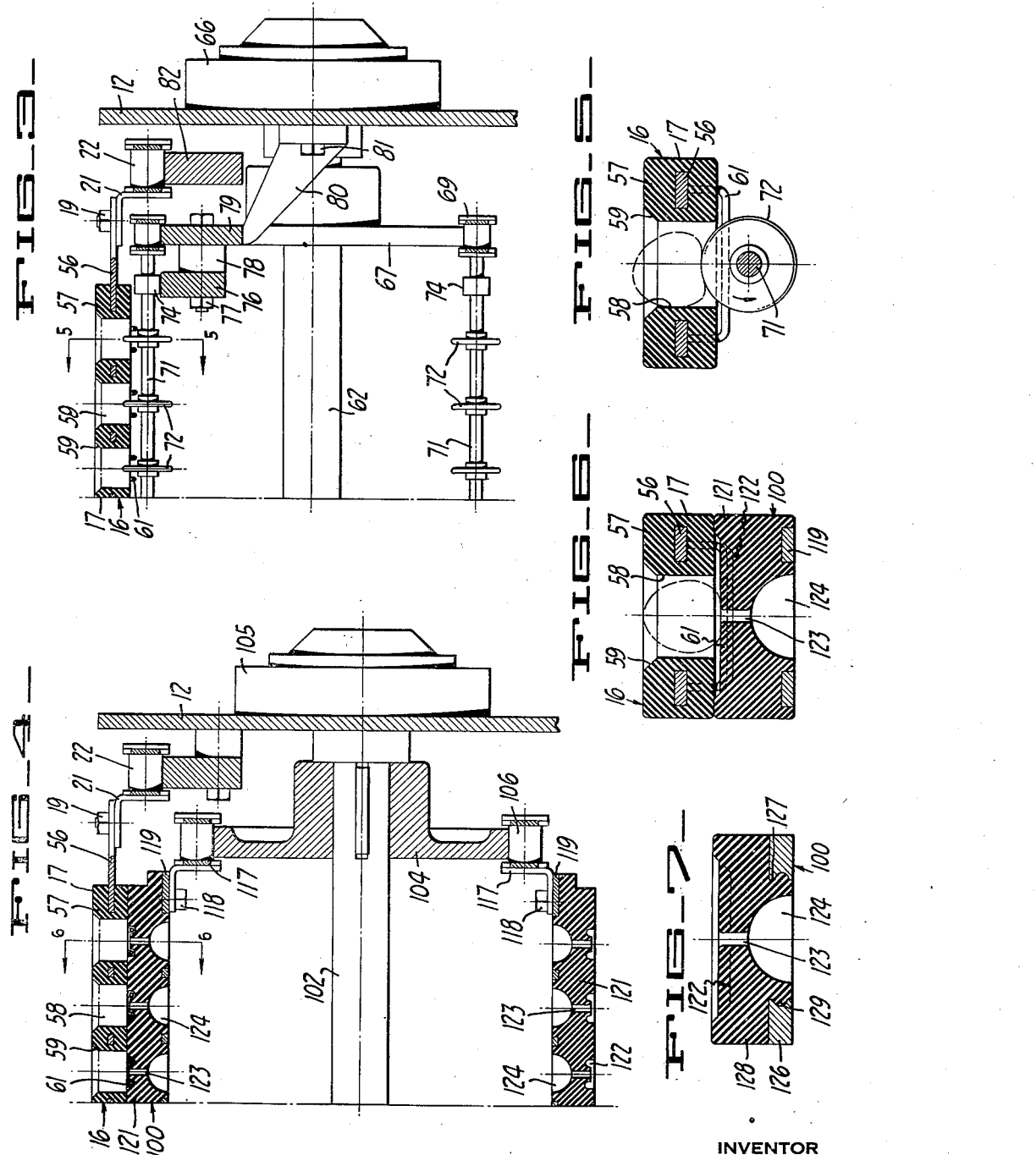
INVENTOR
George W. Ashlock Jr.
BY Robert H. Eckhoff
ATTORNEY Patented Sept. 22, 1942

2,296,490

UNITED STATES PATENT OFFICE 2,296,490

FRUIT ORIENTING DEVICE

George W. Ashlock, Jr., Oakland, Calif.

Application May 28, 1941, Serial No. 395,670

12 Claims. (Cl. 198—33)

This invention relates to the orientation of generally spherical articles having at least one face thereon capable of stably supporting the article on a horizontal surface so that they will be in suitable position for subsequent processing of the articles. As such an article, and solely by way of example, I particularly mention cherries; the machine of the present invention is particularly adapted to the orientation of cherries and other fruit having a stem indentation and to the subsequent stoning or other processing.

It is in general the broad object of the present invention to provide a novel orientation device for such an article as cherries. While in various of my previous patents I have dealt with machines generally directed to this end, the machine of the present invention is particularly characterized in its simplicity, rapidity of operation, ease of maintenance, and particularly in its efficiency.

Another object of the present invention is to provide a machine enabling cherries to be successfully oriented even though the cherries are irregular in shape and somewhat irregular as to size. Previous cherry orienting devices have been successful if the cherries were uniform both as to size and shape. One cannot control the shape of a cherry and since the sizing operations usually practiced depend upon the shape of the cherry, various size cherries will come through in the same grade as a result of a grading operation. The machine of the present invention is particularly adapted to produce a high percentage of cherries oriented with respect to the stem indent and irrespective of their shape.

The invention includes other objects and features of advantage, some of which, together with the foregoing, will appear hereinafter wherein the present preferred form of machine of this invention is disclosed.

In the drawings accompanying and forming a part hereof,

Figure 1 is a side elevation partly in section illustrating a machine embodying the present preferred form of a machine embodying this invention.

Figures 2, 3, 4, 5 and 6 are respectively section lines taken along the designated section lines 2—2, 3—3 and 4—4 in Figure 1; 5—5 in Figure 3; 6—6 in Figure 4.

Figure 7 is a section through a modified form of pitting chuck support.

The frame

The machine of the present invention includes a suitable frame structure made up of suitable structural elements including side plates 12 joined together by suitable cross bracing (not shown) and supported as by legs 14 from a supporting surfaces such as the floor 13. The side plates 12 are spaced apart a suitable distance, the plates being generally rectangular in shape except as appears in the right hand portion of Figure 1 whereat the plates depend to almost the floor level.

The feed conveyor

A first or feed conveyor structure generally indicated at 16 is provided. This conveyor structure is made up of a series of conveyor members generally indicated at 17 (presently further described in detail) secured by bolts 19 to angle pieces 21 on conveyor chains 22 postiioned on opposite sides of the machine. The chains 22 pass about suitable supporting sprockets, there being four sets of these 26, 27, 28 and 29, the sprocket sets being respectively secured on shafts 31, 32, 33 and 34, suitably journaled in the side plates 12 of the machine. Shafts 31 and 34 are normally positioned at about the same level so that the run of the conveyor between them is normally horizontal providing an orientation section generally indicated at 36 and a subsequent pitting or other processing section 37.

Shaft 32 is positioned somewhat rearwardly and below shaft 31 so that the conveyor returns downwardly and rearwardly toward shaft 33, the chains passing about the sprockets on shaft 33 to move upwardly toward the sprockets on shaft 34 through a feed hopper generally indicated at 41 and presently further described.

The conveyor members 17 making up the conveyor 16 preferably include apertured metal plates 56 covered with rubber 57 suitably bonded thereto and apertured as at 58, the aperture size being slightly larger than the cherries or other articles to be handled. The rubber facing is preferably flared as at 59 adjacent the upper side of each aperture to facilitate placing of articles in the aperture. In accordance with this invention, suitable article supporting means such as wires 61 are positioned across each aperture to support an article therein during its transportation from one processing region to another. The wires thus act solely as support means for the cherries or other articles and do not actively cooperate with the article undergoing orientation as will presently appear.

The drive and pitting head

Secured on the side plates is a suitable super-structure 42 carrying an electric motor 43 and a variable speed reducer 44 connected by a chain 46 passed about its drive sprocket 47 to a sprocket 48 on a shaft 49 journaled in the super-structure. The super-structure generally includes suitable pitting or stoning mechanisms such as that disclosed in my Patents 2,157,518 and 2,219,832. Shaft 49 also carries a sprocket 51 thereon connected by a chain 52 to a sprocket indicated at 53 on shaft 31 so that the stoning mechanism and the conveyor 16 are driven in timed relationship, the speed and relation between the two being adjusted by a suitable means such as that disclosed in Figure 1 in my Patent 2,157,518.

The feed hopper

To provide for loading of the conveyor structure 16 I include hopper 41 provided by side plates 40, an end plate 45 and suitable end and side baffles 50 therein after the manner disclosed in my Patent 2,190,970. The conveyor 16 moving upwardly in the direction of the arrow through the hopper 41, each aperture in the conveyor retains a single article which it carries along out of the feed hopper to the presently discussed orientation section 36.

The orientation operation

To provide for orientation of the articles I rotate the cherries supported in the apertures 58. This rotation is preferably effected in a continuous manner during passage of the articles through the orientation section 36. Accordingly, to this end, I conveniently mount shafts 62 and 63 between the side plates 12 in suitable journals 66. On shaft 62 I secure a pair of spaced sprockets 67 while a pair of spaced sprockets 68 are secured on shaft 63, these sprockets serving to support opposite spaced chains 69 providing an orientation conveyor 60. Mounted between the chains and rotatably supported therein are a plurality of shafts 71 carrying suitable wheels 72, each wheel being secured to the shaft and extending upwardly into an aperture 58. Each shaft 71 is rotated relative to the aperture 58 to rotate an article in the aperture engaged with the wheel. This is accomplished during movement of the conveyor 60 by a toothed gear 74 at each end of the shaft engaging a fixed toothed rack 76 secured by bolts 77 and spacers 78 to guide rails 79 carried by brackets 80 secured by studs 81 to the side plates 12 of the machine. Instead of rotating the shafts 71 they can be oscillated by providing spaced racks above and below gear 74 and alternately engaged by the gear; or the rack 76 can be replaced by a chain moved in the same direction or opposite to conveyor 60 and at different rates.

Rotation of the wheels alone is sufficient to result in orientation of the articles such as cherries. Depending upon the weight of the articles and the size, the speed of the wheels can be varied. However, with usual size cherries I have successfully used a ¾" wheel having beveled edges, the wheel being about ⅛" thick and rotating the wheel at about 220 R. P. M., the wheel extending into the aperture for about ¼".

Vibration of the articles

In accordance with this invention I preferably vibrate the articles undergoing orientation at the same time they are subjected to rotation. Conveniently this is achieved by vibrating rails 82 supporting conveyor 16 in the orientation region 36 although it can also be accomplished by vibrating conveyor 60. To this end I pivotally support rails 82 on opposite sides of the machine with a pivotal support 83 at the feed end thereof while at the other end I join the rails together with a suitable shaft 84 and connect this shaft by a link 86 to a suitable vibrating mechanism indicated generally at 87 and mounted upon a bracket 88 on one of the side plates. The rate of vibration can vary over fairly wide limits and I have successfully used frequencies varying between 1,200 and 12,000 cycles per minute. Depending upon the speed of movement of the conveyor 16 and the rate of rotation of the wheels, the speed of vibration can be varied and the three can be varied together to the end that the efficiency of orientation for a selected group of articles is a maximum. To this end, therefore, the vibrating mechanism 87 is preferably made adjustable because it is subject to the greatest variation relative to the other variables.

With the wheels 72 rotating counterclockwise in Figure 5 a cherry is normally jammed against the leading edge of the aperture 58 as appears in Figure 5, and even though the wheel 72 continues to vibrate, the cherry will remain in this position.

Fluid flooding

Orientation of the articles is normally facilitated if they are maintained wet during the orientation operation and to this end I preferably position over each row of articles undergoing orientation suitable liquid supply pipes indicated at 91 and provided with a plurality of jets 92 to eject a suitable fluid, such as water, a processing solution or any suitable liquid lubricating mechanism onto the articles, particularly cherries undergoing orientation.

The pitting mechanism

In the machine disclosed herein it is contemplated that the articles are cherries and that they will be stoned. Accordingly, I provide the pitting mechanism previously mentioned as well as other suitable means to support the cherries during this operation. To this end I accordingly mount shafts 101 and 102 in the side plates by means of suitable bearings indicated at 105. To each of the shafts are keyed suitable sprocket sets 103 and 104 and about the sprockets are trained chains 106 to provide a pitting chuck conveyor 100. A sprocket 107 on shaft 101 is connected by a chain 108 to a sprocket 109 on shaft 31 whereby the conveyor 100 is driven. Shaft 102 also includes a sprocket 111 connected by a chain 112 to a sprocket 114 on a shaft 62 whereby conveyor 60 is driven, both conveyors being driven in time with the main conveyor 16.

Each conveyor chain 106 includes a plurality of spaced angle pieces 117 connected by studs 118 to suitable apertured metal base plates 119 each having bonded thereto the rubber faces indicated at 121, the rubber being bonded to the metal base plate at least along one face thereof and recessed at 122 to receive the article support members 61. A plurality of fruit stone passages 123 are provided to receive and pass the stones ejected from the fruit. To provide proper resilience, each section of the rubber facing is apertured or relieved as at 124 to provide a resilient support for that region of the rubber facing adjacent to the stone passage 123.

In place of bonding the rubber facing directly to the metal, the metal can be relieved and the rubber pitting support or chuck can be provided thereon as an insert. This is shown in Figure 7 wherein the base plate 126 is shown as relieved as at 127. A rubber insert 128 is provided detachably retained by a ring 129 fitting in a complementary groove in the base plate. Any suitable cooperative form of attachment between the base plate and the removable rubber facing can, of course, be employed.

*Operation.*

While it is believed to be clear from the foregoing that the operation of the device is fully set forth, a brief resumé may assist in this understanding. The main conveyor 16 is driven through the motor 43 and the speed reducer 44, the orientation conveyor 60 carrying the rotating wheels and the conveyor 100 carrying the pitting support members each being driven in a timed relationship and at the same rate as the main conveyor properly to position their cooperating elements. With suitable articles to be processed such as cherries placed in the hopper 41, the movement of conveyor 16 through the hopper results in each apertured receptacle in the main conveyor 16 being filled with an article and carried on to the orientation section 36. In this region the main conveyor is rapidly vibrated by rails 82 and, at the same time, each article on the conveyor is lifted from its support means 61 by the rotating wheel 72, the wheel and the vibrating means cooperating, in the preferred machine, to orient the cherry in that position shown in Figure 5 with the stem indent end of the cherry abutting the wheel. To attain this, the wheel rotates the article about a horizontal axis until the article has been correctly oriented. Once oriented the article remains in this position even though the wheel continues to rotate and the article is vibrated. Finally conveyor 16 moves beyond that point whereat it cooperates with conveyor 60 and the wheels are removed from their supporting engagement with the articles. When this occurs, the articles move down gradually onto the members 61 as the conveyor 60 moves around the sprocket and the wheels are gradually moved out of engagement with the articles. This occurs without the articles becoming removed from their oriented position. As the conveyor 16 moves on toward the cherry stoning station the article support is taken over by the pitting chucks on the pitting chuck conveyor 100. In this position the articles are moved on toward the pitting station for pitting, the pits being ejected through the passages 123 into the pit receptacle trough 131 while the articles pass on and fall by gravity into the trough 132 as the conveyor passed downwardly about the sprockets on shaft 32.

*The lubricating fluid*

Previously I have mentioned herein that the articles undergoing orientation should be maintained wet and that water, a processing solution or any suitable liquid lubricant can be employed. Selection of the fluid depends in part on the subsequent use to which the articles are to be put. For example, soapy water is a good lubricant for cherries but the cherries must be thoroughly washed before consumption to ensure freedom from a soap taste. An emulsion of a petroleum white oil can also be employed, the so-called liquid petrolatum, as can emulsion of natural vegetable oils. In general, any material lowering the resistance between the article and the aperture material can be employed so long as it does not harm the article or the machine and is not harmful to humans if the article is intended for human consumption. In place of soapy water I have used water containing various wetting agents such as various sulfated and sulfonated organic compounds, particularly fatty acids and their alcohols such as sodium lauryl sulfate and the like. A list of these wetting agents is given in the January issues of "Industrial and Engineering Chemistry" for 1939 and 1941 and in Bulletin E 504, June 1940, of the Division of Insecticide Investigations of the Department of Agriculture. The use of these is of advantage on brined cherries because of the high relative hardness of the brine in which the cherries are treated.

The use of these lubricants cuts the orientation time to a fraction of that required when the lubricant is not applied. Further, and this is even more important, oriented articles remain oriented even though the wheels continue to rotate in contact with them. The use of lubricants is claimed in another, copending application.

I claim:

1. A machine for positioning a generally spherical article having at least one face thereon indented but capable of supporting the article stably on a horizontal surface, said machine comprising a first conveyor movable over a path, said conveyor including means providing a series of apertures each adapted to restrain an article against unrestricted horizontal movement, a second conveyor movable over a path to position a wheel beneath each aperture to support an article in said aperture and rotate said supported article about a horizontal axis, means for rotating a positioned wheel about a horizontal axis, and means for vibrating said first conveyor during rotation of said wheel.

2. In a device for orienting indented fruit, means providing a generally cylindrical aperture confining a fruit against unrestricted horizontal movement, a wheel adapted to support a fruit when said fruit is positioned in said aperture, a horizontal shaft supporting said wheel for rotation cooperatively adjacent said aperture to rotate said fruit when supported in said aperture by said wheel, means for vibrating said fruit during said rotation by said wheel, and means for supporting said fruit independently of said wheel.

3. In a device for orienting indented fruit, means providing a generally cylindrical aperture confining a fruit against unrestricted horizontal movement, a wheel adapted to support a fruit when said fruit is positioned in said aperture, a horizontal shaft supporting said wheel for rotation cooperatively adjacent said aperture to rotate said fruit when supported in said aperture by said wheel, and means for vibrating said fruit during said rotation by said wheel.

4. In an idented fruit machine, the combination of a holder for the fruit having an opening in its under side, means for placing the fruit in the holder in any position, means for engaging the fruit to support it in the holder and simultaneously rotate it about a horizontal axis and means to vibrate the fruit simultaneously with its rotation to turn the fruit into a position with the dimple downward.

5. In a device for orienting indented fruit, means providing a vertically extending aperture confining a fruit against unrestricted horizontal movement, a wheel adapted to support one of said fruit when said fruit is positioned in said aperture, a horizontal shaft supporting said wheel for rotation cooperatively adjacent said aperture to rotate said fruit when supported in said aperture by said wheel, means for vibrating said fruit during said rotation by said wheel, and a pair of members extending parallel to said wheel to support said fruit independently of said wheel.

6. A machine for positioning a generally spherical indented article having at least one face thereon capable of supporting the article stably on a horizontal surface, said machine comprising a first conveyor movable over a path at a substantially constant rate, said conveyor including a series of apertures each adapted to restrain an article against unrestricted horizontal movement, a second conveyor movable at said rate over a path to position a wheel beneath each aperture to support an article in said aperture and rotate said supported article about a horizontal axis, and means for rotating a positioned wheel about a horizontal axis.

7. A machine for positioning a generally spherical indented article having at least one face thereon capable of supporting the article stably on a horizontal surface, said machine comprising a first conveyor movable over a path, said conveyor including means providing a series of apertures each adapted to restrain an article against unrestricted horizontal movement, a second conveyor movable over a path to position a wheel beneath said aperture to support an article in said aperture and rotate said supported article about a horizontal axis, means for rotating a positioned wheel about a horizontal axis, and means for vibrating an article during said rotation.

8. In a device for orienting indented fruit, means providing a vertically extending receptacle of substantially uniform cross-section, a wheel, a horizontal shaft supporting said wheel for rotation with a portion of said wheel extending into said receptacle to engage and rotate a fruit therein, and means extending across the bottom of said receptacle to admit said wheel and support fruit when not engaged by said wheel.

9. A device as in claim 8 wherein the receptacle is cylindrical.

10. In a device for orienting indented fruit, a fruit conveyor movable over a path and including means providing a series of vertically extending receptacles, each of substantially uniform cross-section, a wheel, a horizontal shaft supporting said wheel for rotation, a second conveyor movable over a path having a portion thereof parallel with and contiguous to said first conveyor path, said second conveyor carrying said wheel and shaft and positioning said wheel with a portion of said wheel extending into said receptacle to engage and rotate a fruit therein, and means extending across the bottom of said receptacle to admit said wheel and support fruit when not engaged by said wheel.

11. In a device for orienting indented fruit, a wheel, means for rotating said wheel in one direction and in a vertical plane to rotate a fruit in engagement with said wheel whereby said fruit tends to follow said wheel, and means for restricting said following movement of said fruit comprising a vertically extending fruit receptacle having an internal cylindrical wall engaged by the fruit on that side of said receptacle which is effective to restrict said following movement, said wall being substantially uniformly spaced from the vertical axis of said receptacle, and at least a portion of said wheel being rotatable within said cylindrical wall.

12. A device as in claim 11 including means for vibrating the fruit during its rotation by the wheel.

GEORGE W. ASHLOCK, Jr.